United States Patent [19]
Davis

[11] Patent Number: 5,460,727
[45] Date of Patent: Oct. 24, 1995

[54] WATER AND WASTE TREATMENT SYSTEMS

[75] Inventor: Arthur L. Davis, North Hollywood, Calif.

[73] Assignee: Oritex Corporation, Azusa, Calif.

[21] Appl. No.: 266,230

[22] Filed: Jun. 27, 1994

[51] Int. Cl.$^6$ ................................................ B01D 21/18
[52] U.S. Cl. ........................ 210/525; 210/526; 198/721
[58] Field of Search ................................ 210/523, 525, 210/526, 527, 541; 198/719, 721, 728

[56] References Cited

U.S. PATENT DOCUMENTS

| | | | |
|---|---|---|---|
| 1,918,742 | 7/1933 | Elrod | 210/529 |
| 3,140,774 | 7/1964 | Johnston et al. | 210/526 |
| 3,151,733 | 10/1964 | Coppee | 198/721 |
| 3,394,816 | 7/1968 | Lowrey | 210/526 |
| 4,441,605 | 4/1984 | Ronco et al. | 198/731 |
| 4,514,303 | 4/1985 | Moore | 210/525 |
| 4,585,116 | 4/1986 | Albrecht | 198/729 |
| 4,645,598 | 2/1987 | Hannum | 210/526 |
| 4,663,042 | 5/1987 | Rasper et al. | 210/526 |
| 4,863,418 | 9/1989 | Fillar et al. | 474/207 |
| 4,932,927 | 6/1990 | Fillar | 474/207 |
| 4,950,398 | 8/1990 | Wiegand et al. | 210/526 |
| 5,165,522 | 11/1992 | Uttke et al. | 198/719 |

*Primary Examiner*—Christopher Upton
*Attorney, Agent, or Firm*—Merchant, Gould, Smith, Edell, Welter & Schmidt

[57] ABSTRACT

A novel waste water clarifier system for use in long settling basins utilizes a novel high strength-to-low mass ratio chain loop system of non-metallic material in a low friction drive and support system in which roller contact is facilitated at all points of wear. The chain links are formed of multiple layers of fiber reinforced resin tapes laminated together within a desired cross-sectional area and incorporating interior bushings for link interconnections into a chain loop. All rotary and linear wear mechanisms are low friction, rolling contact devices, incorporated in or arranged with the necessary flights and shafts. Both long life and protection against equipment malfunction are enhanced by the low mass, low drag components together with the high safety margins in the chain loops.

11 Claims, 9 Drawing Sheets

WATER AND WASTE TREATMENT SYSTEMS

FIELD OF THE INVENTION

This invention relates to clarifier and settling systems for waste water treatment, and more particularly to systems for controllably directing settled and floated solids in large settling basins.

BACKGROUND OF THE INVENTION

In modern waste water and sewage treatment systems, the effluent is often collected in large settling basins, which may be several hundred or more feet long. A chain and flight system within the settling basin is continuously driven so as to prevent the accretion of floating and settled layers, and to introduce controlled-flow patterns, to facilitate water purification in known fashion. The systems generally take the form of a common drive at one corner of the settling basin, engaged to one or more separate drive shafts and associated drive sprockets at each side of the basin. The drive sprockets run continuous chains that extend lengthwise along the top of the settling basin and return along the bottom of the settling basin in the opposite direction. To control and synchronize the chains, idler sprockets are mounted on transverse shafts that are supported rotatably in the side walls. Transverse collector bars or flights coupled to the chain extend across substantially the entire width of the settling basin. These flights move with the chains to direct floating matter toward one end of the basin, usually to a skimmer system at the downstream upper end of the basin, while on the lower return path settled matter is scraped upwardly and in the opposite direction. Because of the size of the system, the forces involved are substantial, in terms of the driving torque required, the reactive force exerted against the flights by the liquid as it is agitated, and the size and masses of the sprockets, shafts, and chains.

Since the clarifier system for the settling basin must operate virtually continuously, and because of the corrosive nature of the waste water and sewage effluents, significant demands are placed on these systems, these demands often being of a conflicting nature. For example, the materials used must be corrosion resistant and substantially unaffected by reactions with the effluent. The elements and subsystems must have long life, under conditions of virtually continuous use, which in turn means that they must also be very wear resistant. This, however, is a function not only of the materials used but of the forces exerted. It is evident that a lightweight, low mass, system involves lower friction and lower tensile stresses on the chain and sprockets, and therefore should result in a reduction in power demands. However, the lengths and sizes of the settling basins are such that the pulling forces on the chains can range from several thousand pounds to much more. Thus the chain system, at its weakest point, must have high tensile strength. The transverse flights must have adequate rigidity under the reactive loads that are imposed, since a common problem is that these flights can distort by bowing or twisting, causing misalignment of the chains and possible catastrophic failure.

Earlier chain systems were constructed of selected heavy metals treated for corrosion resistance. Flights were constructed of a variety of woods and likewise treated chemically for longer life spans. Such components, being massively built, require high power inputs to be driven. The industry more recently has turned to non-metallic systems, using machined, cast or molded sprockets and also fiber-reinforced chain links. Here, some practical limitations based upon materials and design considerations have been encountered. For example, to operate a chain and flight system for a long life span (e.g., 20 years) it is necessary to use a low wear, low fatigue type of construction. While many synthetic resins have low friction characteristics, they are not readily wear resistant, and also tend to creep, swell or elongate because of saturation effects from the liquid. Excessive elongation in a long chain loop over a period of time cannot be tolerated because of the dangers of catastrophic failure and binding in the sprocket drive system. In addition, even though the mass of a largely or entirely non-metallic system may be lowered in comparison to a system using metal components, the reactive forces of the effluent on the transverse flights, together with the mass of the units themselves, still impose substantial loads on the chain links. The response, in some instances, has been to utilize conventional filament winding techniques for making the chain links, so as to achieve the improved strength characteristics of filament winding utilized originally in tubular structures and pressure cylinders. There are limits on the degree of improvement that can be obtained with this technique, and furthermore there are economic limitations that arise from the fact that filament winding is a time-consuming and laborious process, even if automated.

Other load and wear factors introduce further complexities into system considerations. For example, "wear shoes" are commonly disposed on the flights to engage support rails extending along the upper sweep and lower return paths. Thus the flight and chains are externally supported during travel along the continuous loop in different regions. This adds substantial continuous frictional force that must be overcome by the driving forces. Wear on the sprockets and the engaging bushings or pins in the chain links should be substantially uniform, so that there is no point of incipient failure. The presence of grit or other particulate matter in the settling basin cannot be avoided, but should neither cause undue friction nor an increase in wear. The chain link should be stable, and not subject to elongation or creep that would introduce undue wear or create the danger of catastrophic failure. In addition to all these factors, if maintenance is necessary, parts replacement and assembly must be accomplished with a minimum of effort.

SUMMARY OF THE INVENTION

Chain and flight systems in accordance with the invention provide a combination of light weight, high strength, low distortion and low frictional resistance that establish novel capabilities for waste water and sewage treatment systems. Principal exposed and wear-subject elements are non-metallic, low in mass and corrosion resistant. The system is characterized by continuous chains in which the individual chain links comprise, in cross-section, multiple layers of parallel reinforcing fibers, pretensioned within a unifying resin matrix, and built up from pre-formed tapes. The chain links comprise side bars and individual hemispheric ends, with the ends being formed around separate bushings through which connecting pins supporting sprocket-engaging rollers are disposed. Such chain links may readily be fabricated on a mass production basis, by winding a number of parallel or woven filament tapes with partially cured resin concurrently, under tension, about preset bushings, thus assuring both tension uniformity and non-restrictive layering of the reinforcing filaments to maintain their parallelism.

The drive and driven sprockets are advantageously fabricated using toothed periphery sections secured to hubs mounted on transverse, hollow, fiberglass reinforced shafts. The flights are substantially rectangular C-shaped channel sections with a sloped center surface in the principal leg of the channel. They advantageously incorporate, on opposite end walls, roller devices for engaging supporting rails along the upper sweep and lower return portions of the continuous loop. These devices provide rolling support for the chains and flights with minimum wear and friction. By disposing such rollers fore and aft relative to the direction of motion of the flight, torsional forces on the flight, that tend to increase friction and wear, are effectively resisted. Flexible fins at the ends of the flights may be incorporated to cushion contact with the sidewalls of the basin during motion. In consequence of all these factors, the major reactive force to be overcome is that of hydraulic resistance, so that steady state operation can be maintained with low torque and low power demand.

Further to reduce the friction in the system, the ends of the transverse sprocket support shafts are mounted at the side walls in metallic or non-metallic roller bearings. The non-metallic bearing comprises a non-metallic cylindrical race and periodically spaced synthetic resin rollers that engage and support an insert in the shaft.

Another aspect of the invention is a sprocket structure in which the sprocket device is formed in segments having in-going projections with mount holes and outgoing teeth of the desired profile and pitch. The segments are mounted on a hub with bolts through the mount holes, with the periodicity of the teeth being uninterrupted. The segments may be of fixed pre-curved form, but advantageously may optionally be of a synthetic resin structure having a resilience and web structure that enables the segment to be curved by use of readily exertable force. Consequently uniform molded segments of a given profile and pitch can be matched to different diameter hubs.

The roller devices for contacting the support rails may be spherical if desired, instead of cylindrical. In this instance two pairs of spheres are mounted at the end wall of the flight, one pair forward and one pair aft. The spherical bearings afford a greater degree of assurance against clogging by solid matter.

The chain link elements are preferably assembled and processed in multiple sets. Bushings for each end of each chain link are mounted serially in spaced relation along a pair of parallel shafts in a fixture that can be rotated about a central parallel axis. Separate partially cured resin impregnated tapes having multiple parallel filaments are fed onto the bushing pairs as the fixture is rotated about its central axis, the tapes being held under tension. When the desired cross-sectional area has been built up for the chain side bars and hemispherical ends, the entire fixture may be removed and the resin fully cured, with or without further impregnation.

Further in conjunction with this system, there are employed non-metallic skimmers having a series of colinear segments each with oppositely extending helical vanes about a transverse driven shaft. Advantageously, the shaft is of fiber reinforced resin and of square cross-section, with the skimmer being fabricated in sections curving through an angle related to the quadrants of the shaft. Thus the vane sections may simply be mounted on the shaft at an appropriate orientation to provide a continuous vane in a helical curvature about the shaft.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
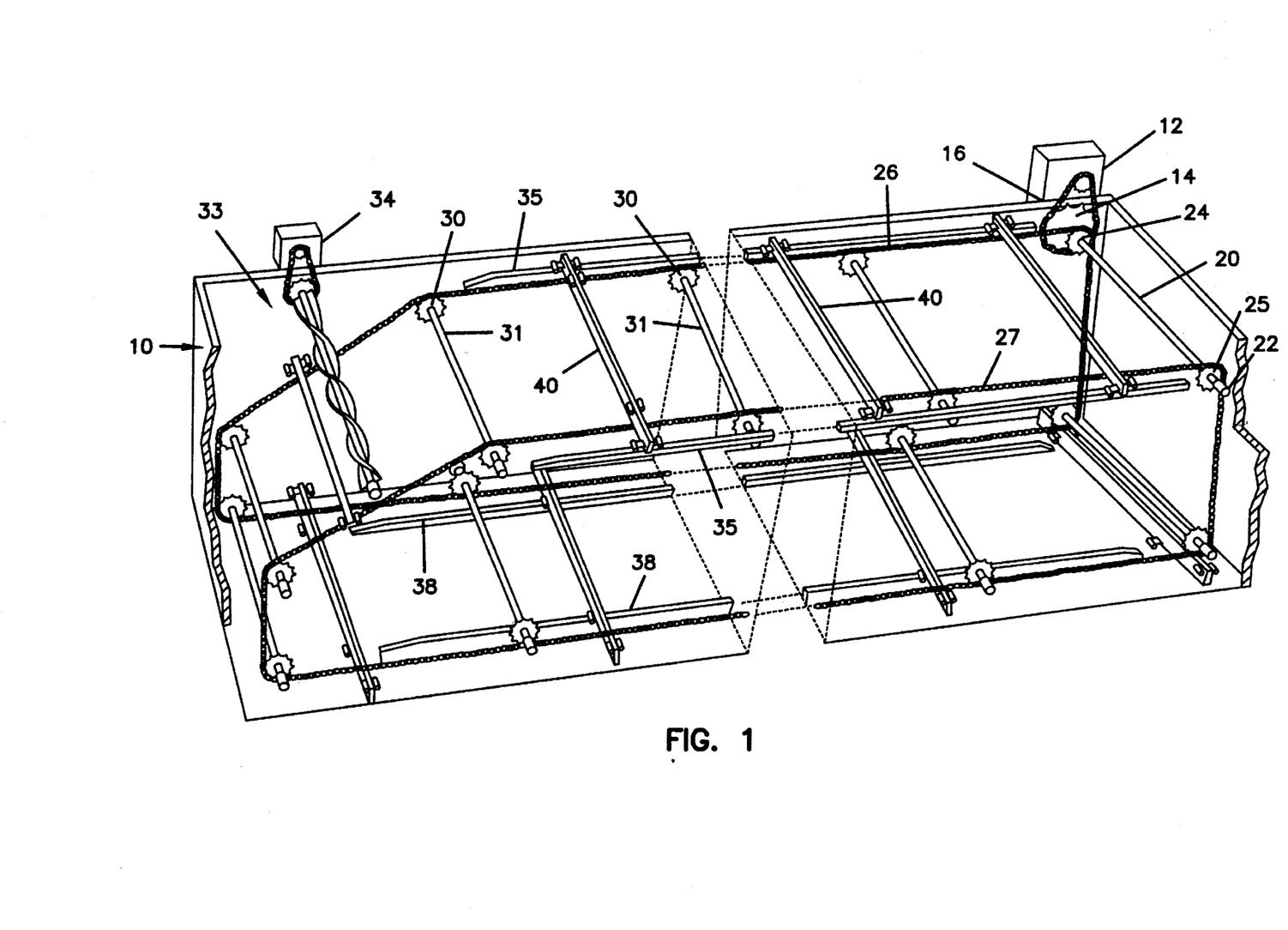
FIG. 1 is a simplified perspective view of a settling basin incorporating a chain and flight system in accordance with the invention.
Figure 2:
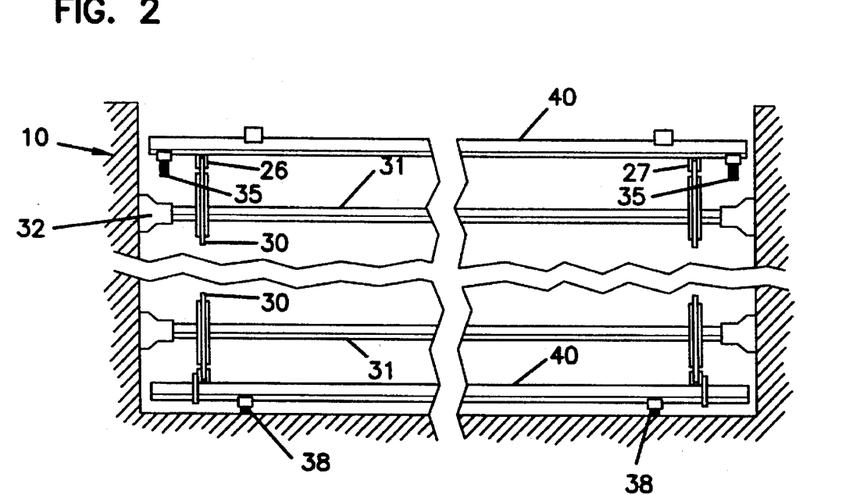
FIG. 2 is a simplified end sectional view of the system of FIG. 1, showing the disposition of some of the principal operating elements therein.

FIGS. 1 and 2 (not to scale) depict a settling basin system 10 in the form of a typical very large rectangular tank, for which exit and entry paths for waste water or sewage are not shown for simplicity. The settling basin 10 is typically of the order of 250'–300' long and includes, in one upper side wall, at the corner of the basin, a drive motor 12 arranged to drive a large drive or bull sprocket 14 via a drive chain 16. The drive sprocket 14 is coupled to a transverse shaft 20 extending across the width of the settling basin 10, and seated in a large bearing 22 in the opposite wall of the basin 10. A pair of sprockets 24, 25 on the shaft 20 provide continuous driving action for chains 26, 27 which are continuous loops extending longitudinally along the basin 10 along the upper surface of the waste water in the basin 10, turning around at the opposite end to a lower return path that extends along the bottom of the basin to the first end, and then recycling past the drive sprockets 24, 25 into the continuous loop.

At selected points along the length of each continuous chain, idler sprockets 30 mounted on transverse shafts 31 extend between bearings 32 (not shown in detail) in the opposite walls of the settling basin 10. The idler sprockets 30 are disposed to support and guide the chains 26, 27 as well as keep the chains in synchronism. As shown, the chain paths extend from the first end of the settling basin 10 along the top of the effluent to define a surface sweep path of substantial length. Before the second or opposite end of the basin 10 the chain paths slope down below a skimmer region adjacent the second end. The chain paths then turn around adjacent the second end while they lower to just above the bottom of the basin 10, returning to the first end, where they rise again to the surface sweep path. A skimmer mechanism 33 rotated by a drive 34 extends transversely across the basin 10 near the second end, to direct surface solids and particulates to one side of the basin 10, transversely to the principal upper flow, which is along the direction of movement of the chains 26, 27.

Although the chains 26, 27 are supported, along the upper sweep path, on the driving and driven sprockets 24, 25, 31, the lengths of these chains are sufficiently long such that their mass and the masses of the devices they carry tend to cause the chain loops to sag. Thus, along the longer spans between the sprockets 24, 25, 31, upper support rails 35 are disposed parallel to the path of movement of the chains 26, 27, but without interference with the chain loop and mechanism travel. At the bottom of the settling basin 10, sagging of the chains 26, 27 is avoided by supporting the mechanisms coupled to them on bottom support rails 38, which may be of T-shaped configuration or simply flat or rectangular strips embedded in the basin floor. The chains 26, 27 support and drive a number of periodically spaced flights 40, here in the form of channel members having generally C-shaped cross-sections. Along the surface sweep path from one end of the basin 10 toward the other, the flights 40 force floating and surface material toward the skimmer region, while along the bottom return path the flights 40 are below the chains 26, 27 and perform the function of stirring and scraping settled matter into the liquid mass.

Figures 3, 4:
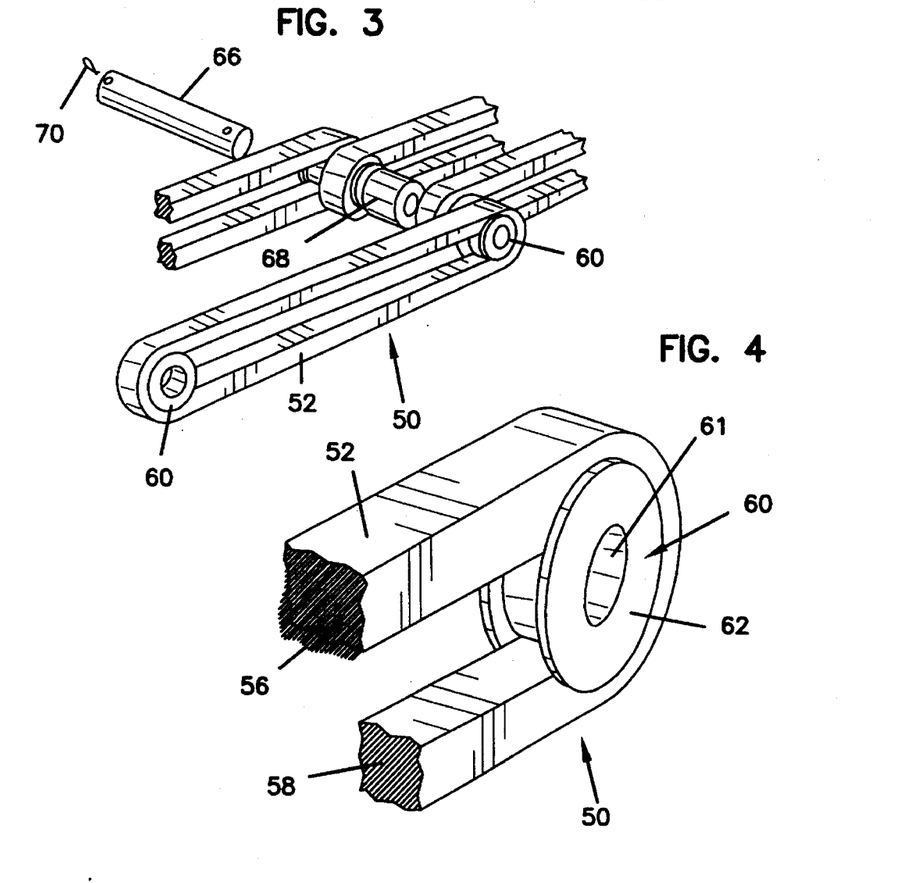
FIG. 3 is a fragmentary exploded view, partly broken away, of a chain link in the chain of FIG. 1.
FIG. 4 is an enlarged broken away perspective of a chain side bar in the chain link of FIG. 3.

The chain loops 26, 27 are characterized by individual chain links 50 (FIGS. 3 and 4) that have extremely high ultimate strength and high strength-to-mass ratios, so that they can bear a significant working load without introducing substantial mass themselves. The chain links 50 have a continuous form including linear side bars 52 integrally merging into hemispheric ends 54. The chain links 50 are, in a preferred form, characterized by cross-sections defined by layers of parallel continuous individual glass reinforcing filaments 56, as seen in FIG. 4, embedded in a high-strength, here vinyl ester based, matrix 58. The filaments 56 provide a glass content of approximately 65% in the uncured form. The links 50 are preferably formed by winding preformed tapes (lying parallel to the filament direction) under some tension. The material used in this example is available from Quantum Composites, Inc. as OC-8816, a reinforced sheet molding compound in sheet or tape form. For this application, sufficient strength is obtained with a chain link cross-section of one-half inch on a side. The parallelism and continuity of the individual reinforcing filaments 56 maximize the strength of the reinforcing structure and the tape configuration is particularly useful to the forming process, which is described hereafter. Alternatively, somewhat lower but still adequate strength is achieved using type 3743 crowfoot weave tape from Hexcel Corp. of Fountain Valley, Calif. This has a filament count, in ends/inch, of 49×30 and a thickness of 0.0085". Pretensioning also assures parallelism and alignment of chain links formed using this type of tape. The chain link 50 construction is further facilitated by formation of the chain link 50 about end bushings 60 that are then incorporated within the link structure 50. The end bushings 60 are of low friction material, such as acetal, or acetal with carbon or nylon fiber reinforcement. For very high loads the end bushings or bearings are of 17-4 stainless or all stainless alloy. The bushings 60 have a central bore 61 for receiving a connecting pin in the chain link, and radially extending flanges 62. The flanges 62 are spaced apart to confine but not restrict or crimp the edges of the filament layers, so that there is no chafing or distortion when the fabrication process is correctly carried out, as described below.

As seen in FIG. 3, the chain links 50 are disposed in series, with inner and outer pairs overlapping in conventional fashion so that the end bushings 60 are in alignment to receive connecting pins 66, which may be of metal, metal having a low friction synthetic resin surface, or fiberglass reinforced material of pultruded or other form. Between the spaced apart innermost pair of chain links 50, a roller sleeve 68 encompasses the connecting pins 66 to provide a roller contact for engagement with the teeth of drives and driven sprockets. The roller sleeve 68 may be of solid or hollow metal, or metal having a low friction synthetic surface. Cotter pins 70 or other means are utilized to hold the chain link 50 pairs on the connecting pins 66. At selected points along the chains 26, 27, the connecting pins 66 are longer than elsewhere to provide end extensions for engaging within brackets that support and drive the flights 40.

The relatively light weight, high strength chains 26, 27, and low friction contact at the numerous wear points along the system provide important mechanical and operative features. These features include the manner of mounting and driving the sprockets, which are necessarily large and somewhat massive but which are low friction units driven with relatively low constant torque. Referring now to FIGS. 5 to 8, there are shown a main drive or bull sprocket hub 72 which is turned by the drive chain 16 and mounted rotatably in the fixed bushing 22 of FIG. 1. The main drive sprocket hub 72 has an internal bore and an encircling clamp mechanism 74 for affixation about the main transverse shaft 20. The hub 72 also includes a periphery 76 to which separate sprocket segments 78 are affixed to define its outer working circumference. Axial bolts circumferentially spaced about the hub 72 for attaching the segments 78 are not shown for simplicity. Sprocket teeth 79 on the sprocket segments 78 have a given pitch to match that of the drive chain 16 of FIG. 1. Adjacent the main drive sprocket hub 72, but inboard on the transverse shaft 20, is a chain drive hub 80 also having an internal bore to receive the shaft 20, and a side clamp 82 for engagement to the shaft. As an additional means of attachment and to prevent the sprocket from turning on the shaft, stainless pins (not shown) extending through each side clamp and shaft may be used. The periphery 84 of the chain drive hub 80 supports sprocket segments 86, with the teeth of the sprocket segments matching the pitch of the chains 26 or 27. Again axial bolts (not shown) may be spaced about the periphery 84 to attach the segments 86. Inasmuch as both chain drive sprockets 26, 27 are alike, only one need be described.

Figure 5:
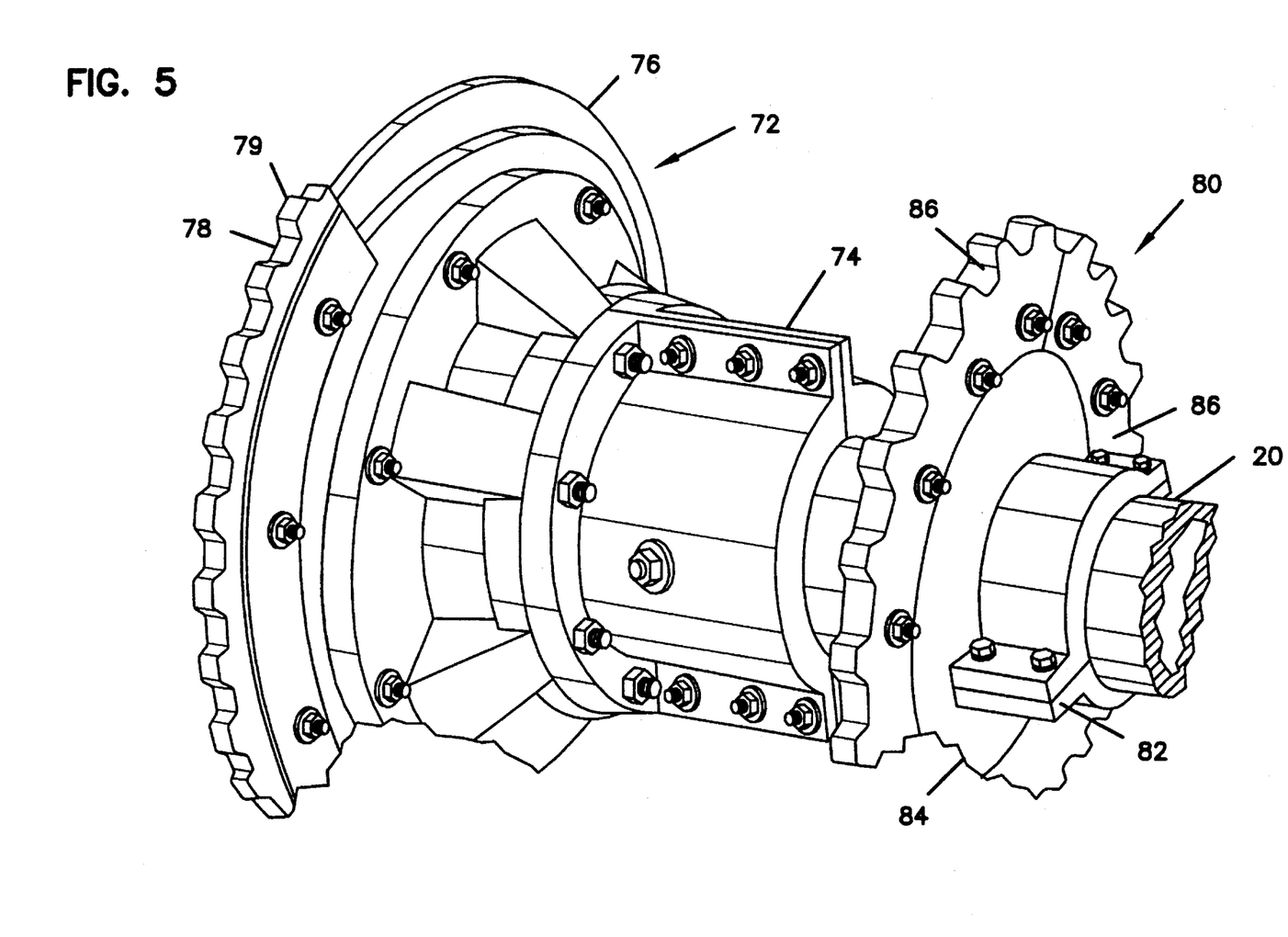
FIG. 5 is a perspective view of a main drive sprocket arrangement used in the system of FIGS. 1 and 2.
Figure 6:
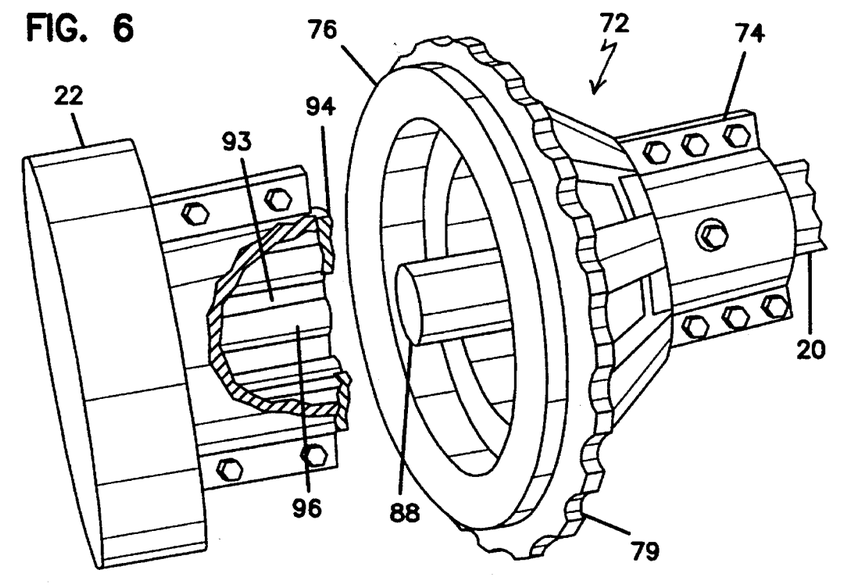
FIG. 6 is an exploded view, partly broken away, of a part of the main drive of FIG. 5.
Figure 7:
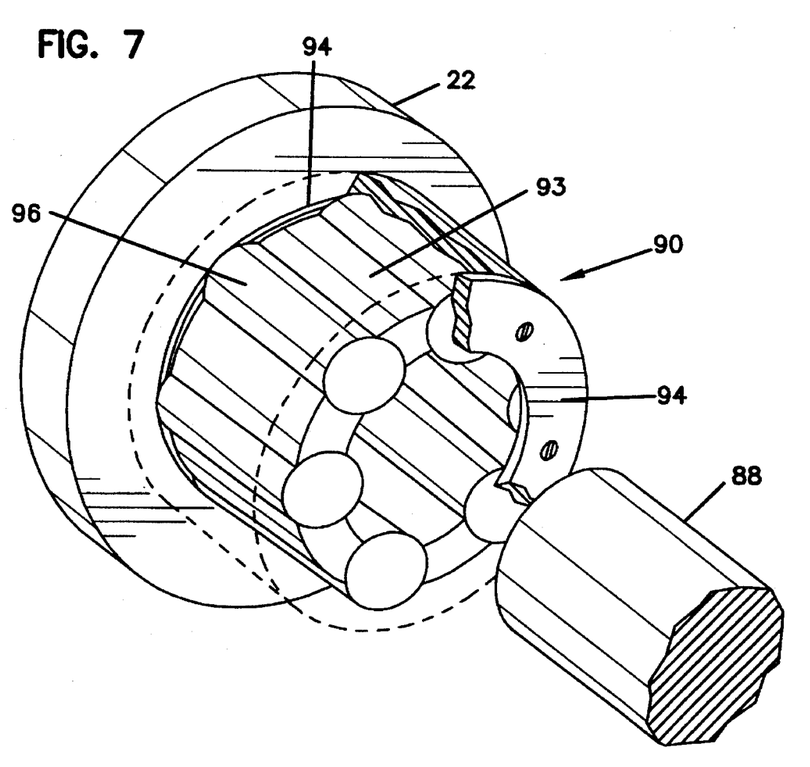
FIG. 7 is another exploded view, partly broken away, of a part of the main drive of FIG. 5, showing the roller bearing used therein.
Figure 8:
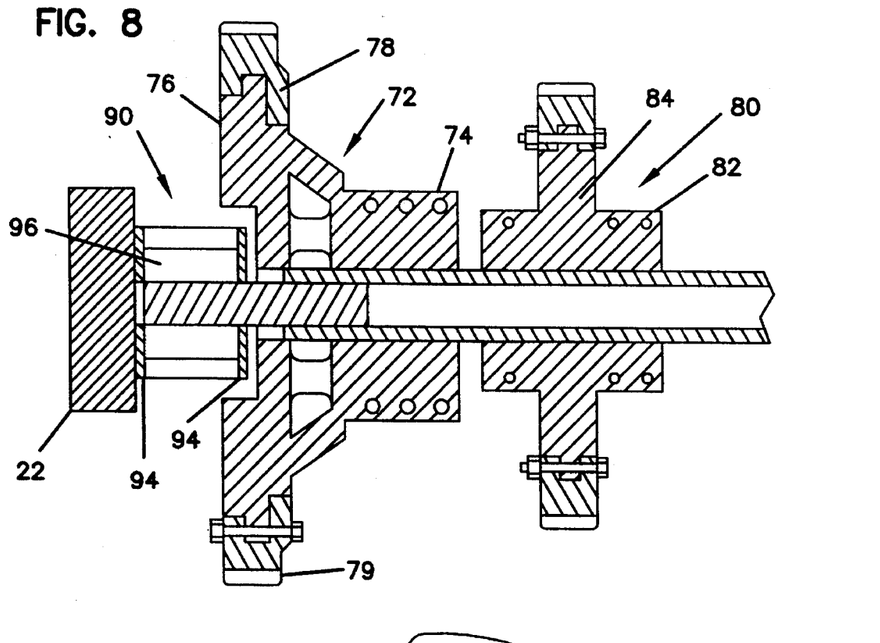
FIG. 8 is a side sectional view of the arrangement of FIG. 5.

As seen in FIGS. 5 to 8, the transverse shaft 20 is hollow, and its end extending through the main drive sprocket hub 72 is close to the aligned end of the fixed bearing 22 (not shown in FIG. 5). A solid cylindrical shaft insert 88 within this end of the shaft also extends into a cylindrical roller bearing and support 90. This includes a cylindrical ring cage 92 having a number of axial bores evenly spaced about its periphery, and secured together by end ring plates 94. Cylindrical polymeric resin rollers 96 within the axial bores engage both the exterior surface of the shaft insert 88, and the interior surface of the bearing 22 (not shown in FIG. 5). This rolling contact, together with the low friction characteristics of the polymeric resin rollers, not only supports the large mass of the shaft, hubs and drive chain, but also maintains low friction wear points by which minimal constant torque operation is facilitated.

Figures 9, 10, 11:
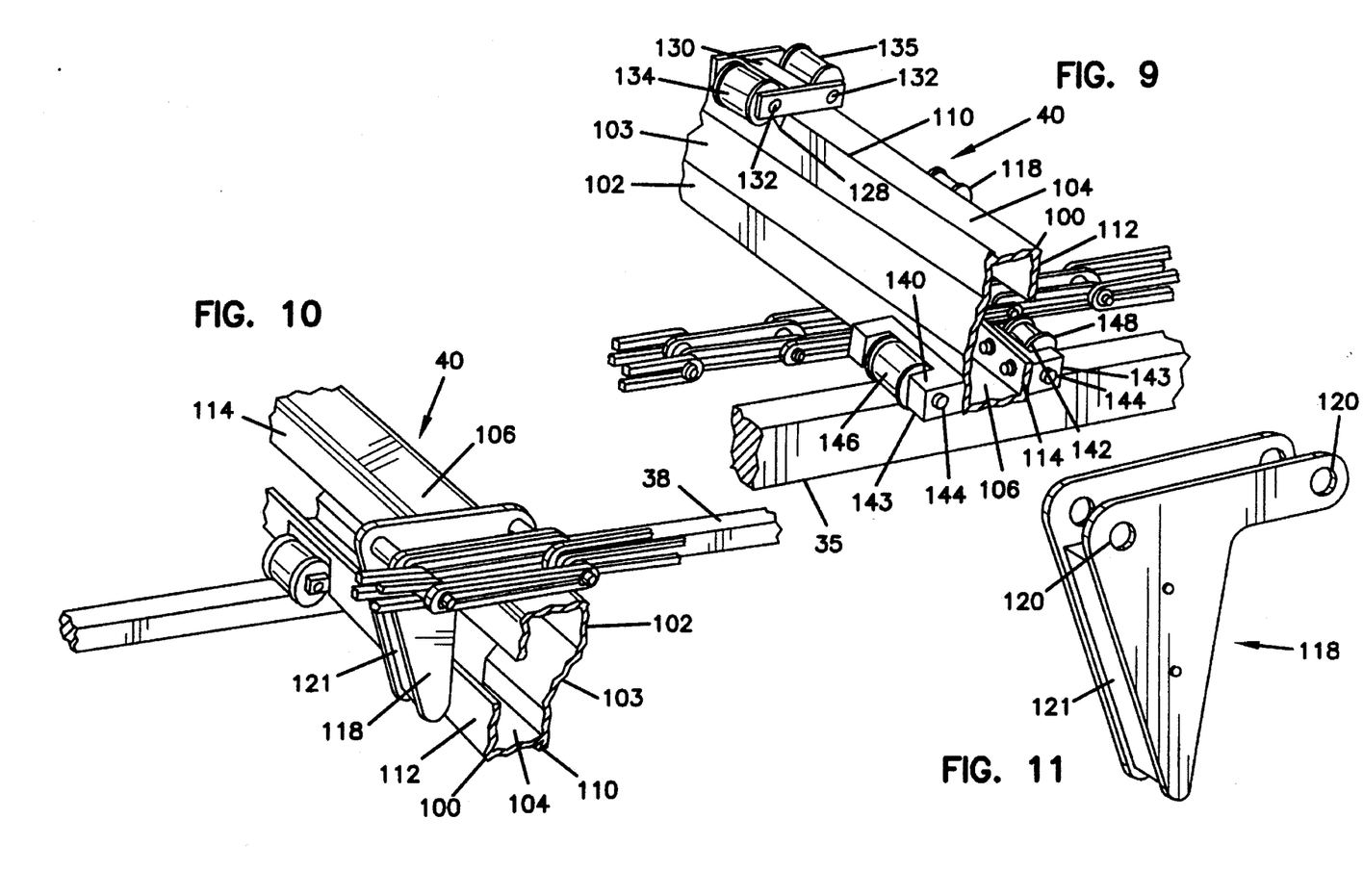
FIG. 9 is a fragmentary perspective view, partially broken away, of a portion of a transverse flight, chain drive and low friction support system used in the upper sweep path of FIGS. 1 and 2.
FIG. 10 is a fragmentary perspective view, partially broken away, of a portion of the flight and support system used in the lower return path of FIGS. 1 and 2.
FIG. 11 is a perspective view of a flight pusher bracket used in the arrangements of FIGS. 5 and 6.

The flights 40 are preferably fabricated as C-channel members 100, as shown in FIGS. 9 and 10. Fiberglass fabric reinforced channels of the C-configuration shown have high resistance to torsion and bowing forces that act against the long face of the C-channel. Such forces are exerted by hydrodynamic resistance to motion within the settling basin 10. The needed sweeping and scraping actions within the basin are established without requiring a large mass or mechanical reinforcement for the flight 40. Each end of each flight 40 may include an outwardly extending flexible wing or fin (not shown) which acts as a compensator for irregularities in the wall of the basin, and swaying of the flight 40 from side to side. Thus frequent tendencies of a flight to wedge or brake by engagement of its end against the side wall ar obviated. The C-channel member 100 includes a principal front wall 102, the word "front" referring here to the direction of movement of the flight 40 through the settling basin 10. The front wall 102 comprises a central sloped surface 103 that directs fluid upwardly or downwardly dependent on its attitude during recirculation. The front wall 102 merges into a first end wall 104, which is on top when the flight 40 is moving along the surface sweep path (FIG. 9). A second end wall 106 at the opposite side of the flight from the first end wall 104, is conversely in the superior position when the flight 40 is moving along the bottom return path (FIG. 10). The front wall 102 has a small edge projection 110 above the first end wall 104. The rear section of the C-channel member 100 includes, also integral with the structure, a pair of rear wall sections 112, 114 forming the open end of the C, and having a gap between them. The flight 40 is coupled to a chain link by a coupling bracket 118 (FIG. 11) of approximate L-shape, with the end bar of the L containing a pair of holes 120 within which end extensions of the connecting pins of the chain links are engaged, for driving the flight. The long arm or base of the L-shaped bracket 118 is coupled to the rear wall sections 112, 114 of the C-channel member 100. An interior block 121 within the bracket 118 rigidifies the bracket 118 and provides a body for both attachments (not shown) to the flight 40.

The C-channel member 100 also is used to provide support for rolling contact with the upper support rails 36 in the upper sweep region and the bottom rails 38 in the lower return sections of the basin 10. Referring again to FIGS. 9 and 10, the first end wall 104 of the channel member 100 includes an inset section 128, into which a roller mechanism support bracket 130 is mounted, the bracket including a pair of shafts 132, mounted parallel to the longitudinal axis of the C-channel member 100, for supporting a pair of rollers 134, 135 in fore and aft relationship relative to the C-channel member 100. The rollers 134, 135 are positioned along the transverse dimension of the flight 40 to be in alignment with the bottom support rails 38 of FIG. 1, and the rollers 134, 135 protrude slightly so as to provide the sole engagement with the underlying rails.

Although upper support rails 34 will not necessarily be used with shorter settling basins 10, this type of support can be important in longer installations. Accordingly, as also shown in FIGS. 9 and 10, the C-channel member 100 supports roller mechanisms adjacent to the second end wall 106, in alignment with the upper support rails 36 shown in FIG. 1. One bracket 140 extends in the forward direction from the front wall 102, while a second bracket 142 extends in the aft direction from the rear wall section 114. Each bracket 140, 142 includes a pair of spaced apart arms 143 defining a span in the direction parallel to the C-channel member 100. A roller shaft 144 between each of these arms supports a cylindrical roller 146 or 148 that protrudes past the second end wall 106, for contact between its rolling surface and the support rail. In addition, the span between these two cylindrical rollers 146, 148 resists torsional forces exerted by the chain or by water resistance on the C-channel member 100. Again, contact is solely with rolling surfaces, and friction and wear are both consequently reduced.

Figure 12:
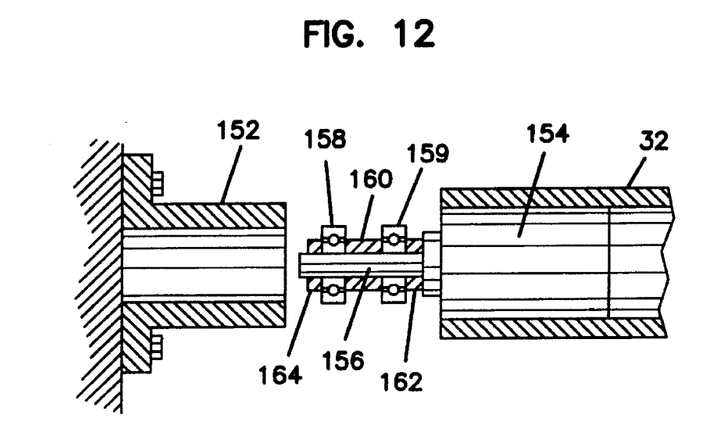
FIG. 12 is a side sectional view of a roller bearing support for a transverse shaft in the arrangement of FIGS. 1 and 2.

Although roller bearings of non-metallic base materials may also be used to support the driven sprockets and shafts, it is preferred to use a combination of polymeric bearings and shafts together with metal roller or ball bearings for these smaller units. Referring now to FIG. 12, the transverse shaft 32 extends, at the side wall of the basin 10 of FIGS. 1 and 2, to adjacent a wall mounted support 150 from which a cylindrical support 152 extends concentric with the shaft 32 central axis. The shaft 32 is hollow and receives a cylindrical insert 154 in a close sliding fit. A bearing shaft 156 is mounted in the outer end of the insert 154, and supports the inner races of a pair of spaced apart ball bearings 158, 159 separated by an intermediate spacer 160. An inboard spacer 162 and an end retainer 164 on the bearing shaft 56 holds the ball bearings 158, 159 in axial position. The outer races of the ball bearings 158, 159 rest within and engage the support 152 to provide the low friction, low wear support that is advantageous to the system.

It may thus be seen that by assuring rolling contact throughout the system at all points of possible wear, and by rebalancing the system based upon the novel light weight, high strength chain links, a system combination is defined by which minimal power consumption is achievable for the long term steady state operating mode. The primary forces to be overcome are the resistance forces offered by displacement of the fluids in the settling basin. The normal pulling load on the chain loops 26, 27 is about 2,800 pounds, whereas the novel chain links have a much higher ultimate tensile strength on a single link basis.

For ½"×½" side bars the single link ultimate tensile strength has been tested to be in the range of 23,400–26,000 pounds for chain links fabricated using the Quantum Composite parallel filament tapes. Single chain links of this cross-sectional size based upon the Hexcel Corp. crowfoot weave tape have had ultimate strengths of approximately 19,000 pounds, still far above the needed strength and well in excess of the 12,000 pound break point exhibited by filament wound chain links of the prior art. The ultimate tensile strength of single chain links can be computed by formula, as well as empirically, based upon the number of turns and width of tape or the total cross-sectional area. For example, the ultimate tensile strength of an individual chain link of 2 in.$^2$ cross-section would be in the range of 100,000±5,000 lbs.

In addition to the mechanical properties thus achieved, these chains are corrosion resistant and not subject to meaningful elongation because of water saturation for long periods. In addition, they are operated so far below their tensile capability that the possibility of failure due to stress loading in multi-year operation is greatly reduced.

Figures 13, 14:
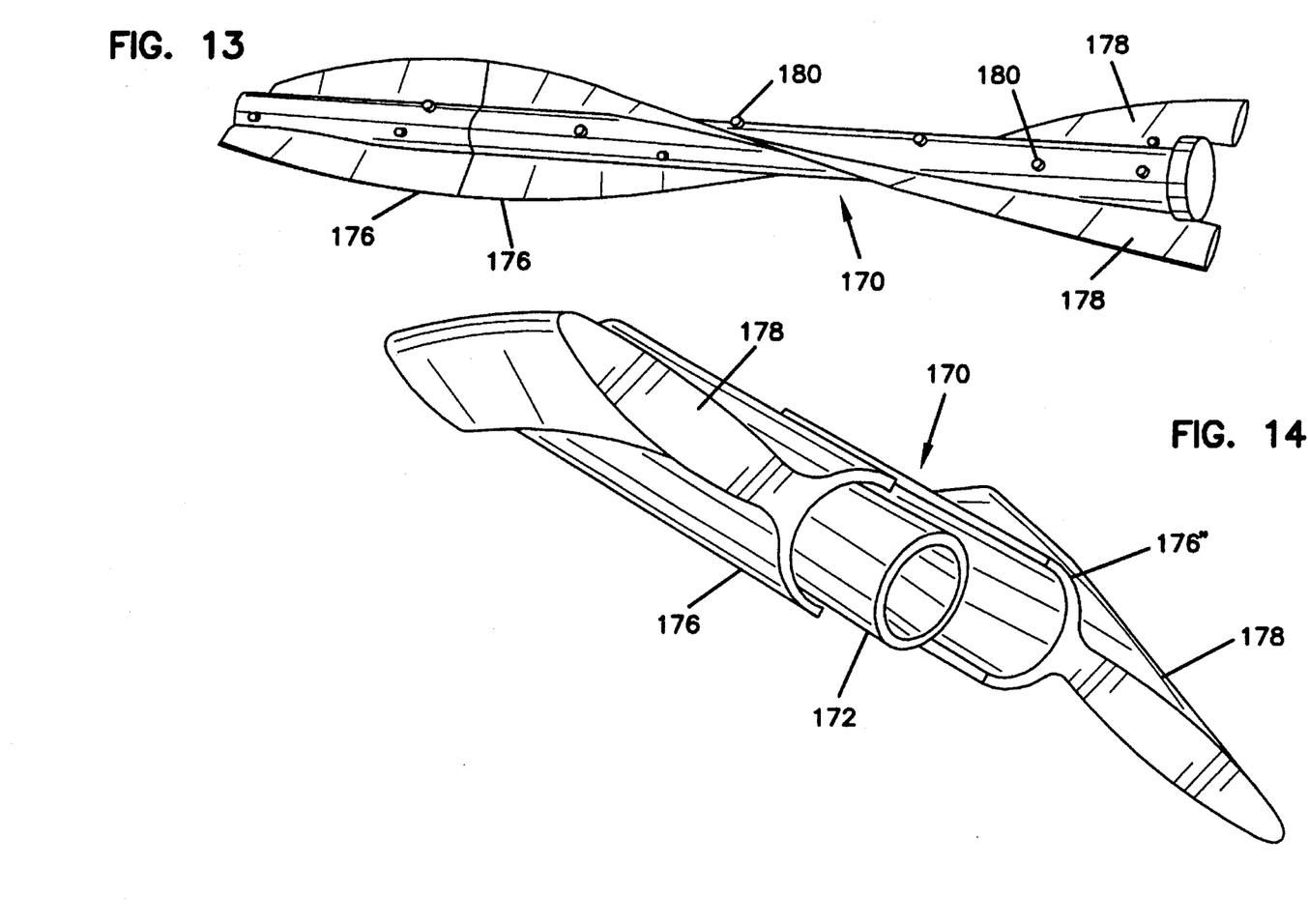
FIG. 13 is a perspective view of a part of a skimmer mechanism in accordance with the invention.
FIG. 14 is an exploded perspective view of a part of the skimmer mechanism of FIG. 13 showing further details thereof.

An advantageous form of skimmer mechanism is provided by the transverse, helically configured skimmer unit 170 of FIGS. 13 and 14. The exterior skimmer structure 32 of FIG. 1 is mounted on a shaft 172 turned by a drive 34 (as in FIG. 1), in conventional fashion. The skimmer unit 170 comprises a number of sleeve sections 176 about and along the shaft 172, the sleeve sections being in end-to-end abutting relation. The sleeve sections 176 in this example are formed as split halves 176' and 176" (FIG. 14 only), each of which has a radial helical vane 178 with a selected pitch relative to length curvature. When successive sections 176 are placed together they form an uninterrupted helix. With pairs of vane 178 sets extending radially in opposite directions a balanced, double vane structure is formed. The sleeve sections 176 are secured to the shaft 172 by bolts 180 in this example.

Although the skimmer shaft 172 may be a fiber reinforced hollow structure, it can optionally be of solid or metal construction. The sleeve sections 176, in contact with the liquid, however, are advantageously molded as individual parts of corrosion resistant synthetic material, and therefore readily assembled and disassembled on the shaft 172. One or more skimmer units 170 of this type provide an efficient means of impelling surface and other floating material transversely relative to the main flow path.

The method of making the chain links is amenable to mass production as well as precision manufacture. Tapes having parallel continuous or woven filaments embedded in a thin resin carrier, in partially cured or "B" stage are wrapped under tension around the pair of spaced apart end bushings 60 within the side flanges 62 to build up the chain links 50 of FIGS. 3 and 4. The side flanges 62 have sufficient separation to accommodate the tape width, without looseness. Holding the end bushings 60 in fixed relation, the tape is wrapped around them until the desired cross-sectional thickness is developed for the side bars 52 and the hemispheric ends 54. Since the B stage resin is tacky at this point, the layers adhere without slippage to each other in packed form because of at least light tensioning. When the desired cross-sectional area has been built up, the entire unit is placed in a heating oven, and the resin is fully cured at temperature.

Figure 15:
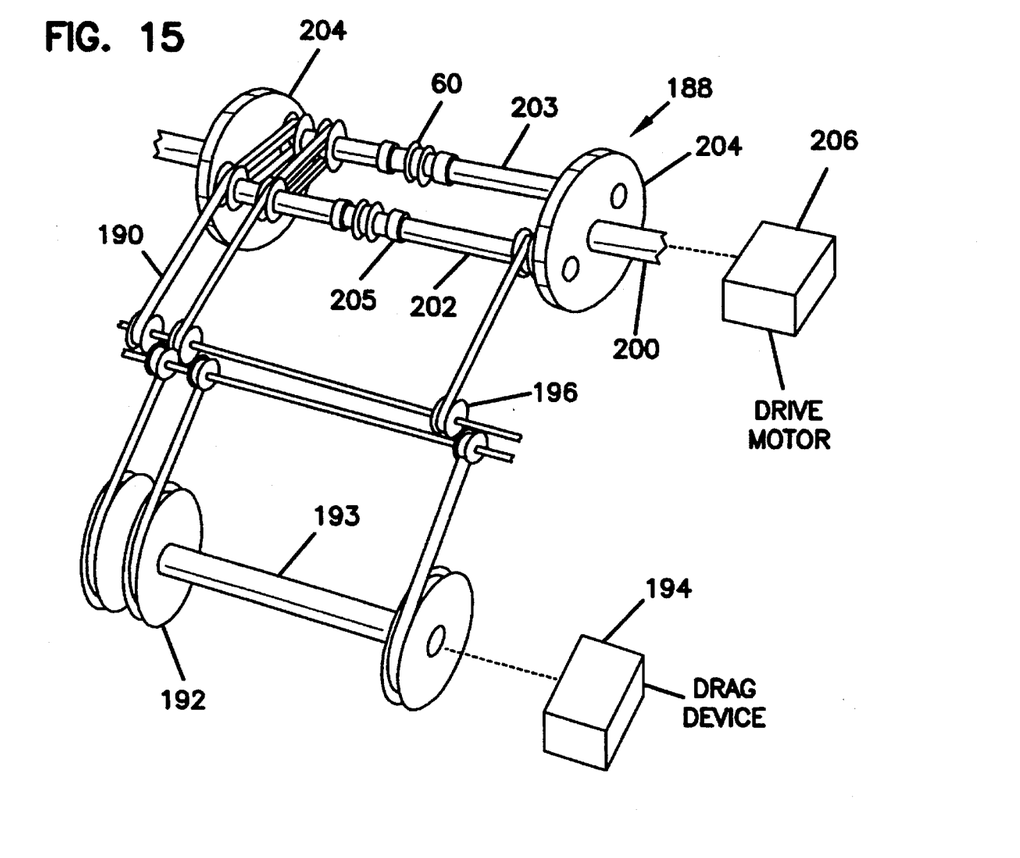
FIG. 15 is a perspective, simplified view of a mechanism for concurrent fabrication of a number of chain links in accordance with the invention.

An example of a system for practicing this method is shown in FIG. 15, to which reference is now made. This is a parallel winding system in which a multi-parallel filament tape 190 is fed from supply rolls 192 on a shaft 193 that may be restrained against movement by a conventional drag device 194. In addition or alternatively, controlled tension may be applied to the tape 190 during the winding process by passing it through a convoluted path defined by guides 196. The winding is accomplished on a fixture 198 having a pair of parallel mandrels 202, 203 supported by hubs 204 extending from a common central shaft 200. A drive motor 206 rotates the common central shaft 200 and therefore the parallel mandrels 202, 203 rotate concentrically about the common axis. Pairs of end bushings 60, each to be incorporated in a different chain link 50, are mounted on the separate mandrels 202, 203. The bushings 60 are axially separated by spacers 205 to maintain alignment with the supply rolls 192 and with the other end bushing of the pair.

As the common central Shaft 200 of the fixture 198 is rotated by the drive motor 206, therefore, the bushings 60 are rotated as satellite pairs about the intermediate center axis, taking up tape 190 under tension from the supply 192. When the desired cross-sectional area has been attained, the tapes 190 are cut and the entire fixture 198 is removed from the system so that the resin may be cured to a final stage at the necessary temperature. When this has been accomplished, the multiple chain links are available for use.

Tension control is less demanding and at a lower level for tapes having parallel filaments than for tapes having a woven form, whether crowfoot or other. In the latter example, a tension of about 30 to 70 pounds, usually in the range of approximately 45 pounds, is applied during wrapping. When the chain links are cured while still on the fixture, the tension is not released, so that the final curing is effected without allowing the weave to relax and tend to return to original unstressed shape.

Figure 16:
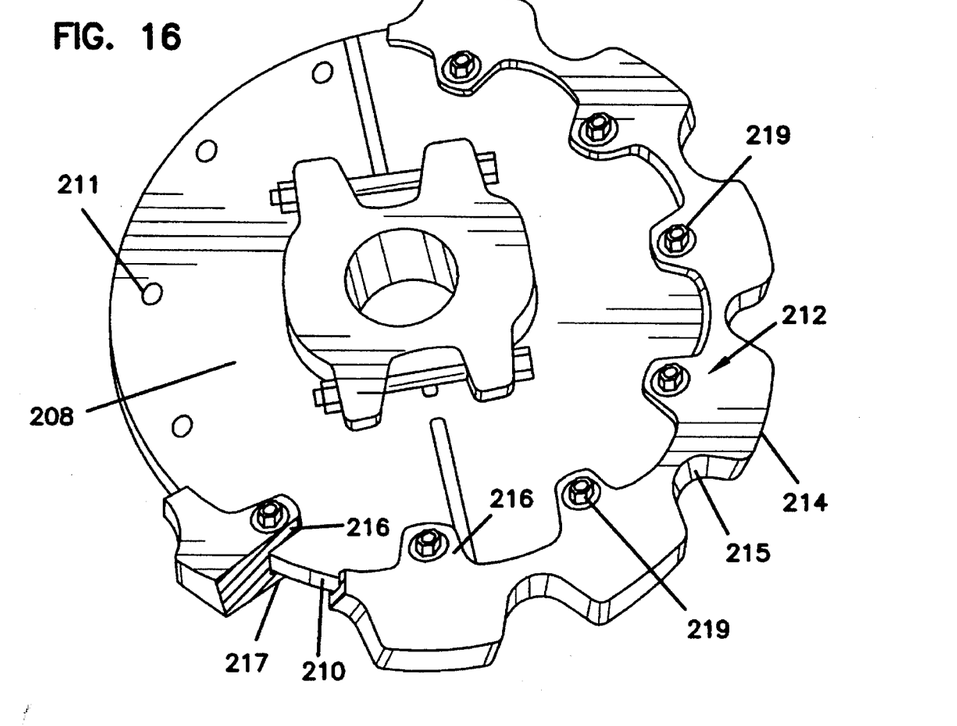
FIG. 16 is a perspective view, partly broken away, of an alternative sprocket mechanism.

An advantageous form of sprocket system is shown in FIG. 16, in which a sprocket hub 208 formed of two clamped halves is shown, having a lip 210 of predetermined thickness, with through holes 211 spaced circumferentially about the lip 210. Curved sprocket sections 212 (only one of which is shown) fit on the lip 210, and have teeth 214 extending radially outwardly from thinner web sections 215. Pairs of inward projections 216, 217 from the webs 215 fit opposite sides of the hub lip 210 and are regularly spaced about the inner part of the web 215. The circumferential spacings between the inward projections 216, 217 match the circumferential spacings between the holes 211 in the lip 210 of the hub 208. Holes 218 in the projections 216, 217 are placed to match the holes 211 in the lip 210. Thus, the curved sprocket section 212 fits over an arc on the peripheral lip 210 and bolts 219 through the holes 218 secure each sprocket section 212 to the lip 210. This arrangement reduces the size of the molded part and also permits easy disassembly and assembly.

Figures 17, 18:
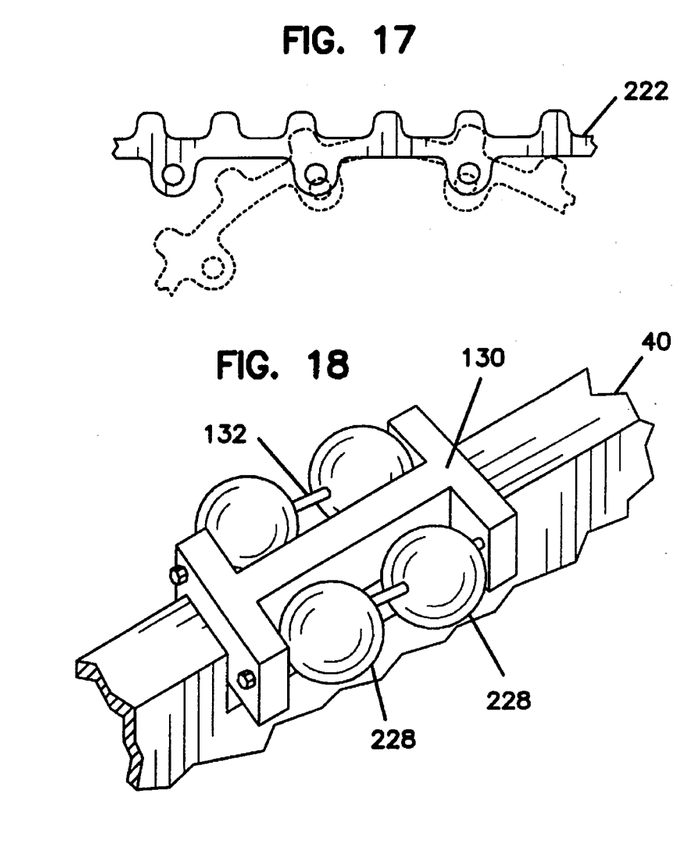
FIG. 17 is a perspective view of a bendable sprocket tooth arrangement that may be used in the mechanism of FIG. 16.
FIG. 18 is a fragmentary perspective view of a different form of roller bearing and support for a flight mechanism.

A different version of the sprocket mechanism is shown in FIG. 17, wherein the sprocket sections are like those immediately above, except that they are manufactured as nominally straight molded sections 222, in which the webs 224 can be curved. Consequently, for a given pitch defined by the spacing between the sprocket teeth, these nominally straight sections 222 can be matched to hubs of different diameters, longer sections being segmented to different curved lengths, as needed. The curved position, shown in phantom, renders the sections 222 geometrically the same as the curved molded sections.

In some instances the cylindrical type of bearing, which makes line contact with the surface on which it rolls, may introduce more drag than desirable because solids may become entrapped in a wedging action. An alternative type of roller bearing is presented in FIG. 18, in which the bracket 130 has shafts 132 parallel to the flight 40, as before, but rolling contact is provided by pairs of balls 228 on the shafts 132. These balls 228 roll with essentially point contact engagement, and thus have less possible interference because of grit or other solid materials catching in the rolls.

Figure 19:
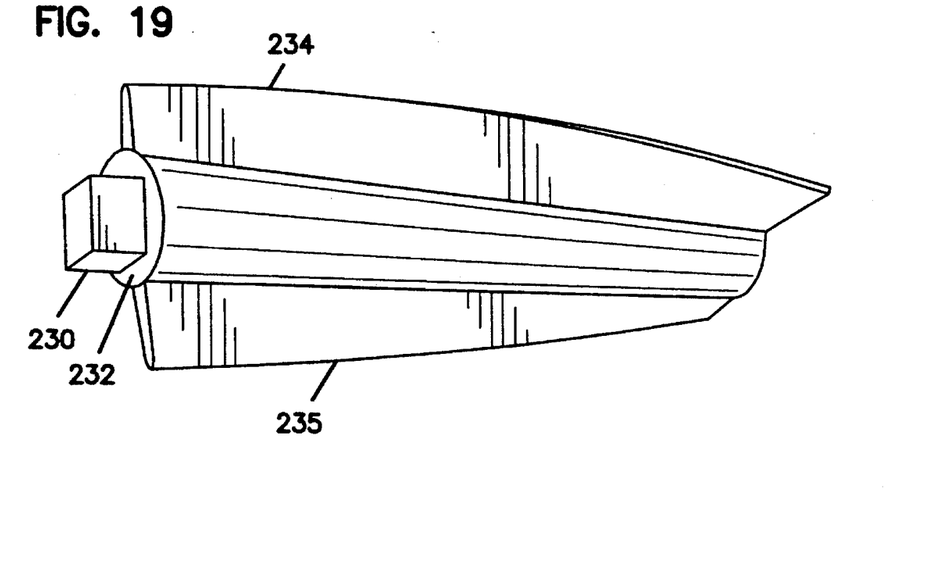
FIG. 19 is a fragmentary perspective view, partially broken away, of a different configuration of skimmer mechanism in accordance with the invention.

An alternative form of skimmer design is shown in FIG. 19, this version being preferred for cost and easy assembly. The skimmer shaft 230 is constructed with a square exterior, although it might be a round shaft with multiple splines. The individual sleeve sections 232 have complementary interior shapes which mate about the shaft 230, and two exterior helical vanes 234, 235. The vanes 234, 235 extend oppositely from the sleeve section 232 and their curvatures are matched to the length of that section, so that placing the sections 232 end-to-end, with incremented rotation of successive sections, forms two uninterrupted helices. This type of section 232 can be molded as a single piece and can be attached to the shaft 230 without bolts.

While a number of forms and modifications have been described above, it will be appreciated that the invention is not limited thereto but encompasses all expedients and modifications within the scope of the appended claims.

I claim:

1. A clarifier system for waste water treatment facilities in which waste water in a settling basin is impelled by flights mounted on continuous recirculating chains comprising:

a pair of continuous loop chains disposed along parallel paths in the settling basin, the chains each comprising a plurality of pairs of low mass, high strength chain links, each characterized by a plurality of layers of individual reinforcing filaments embedded in a resin matrix and including parallel side bars and integral hemispheric end portions;

drive means including hollow drive shaft means, rotatable drive sprocket means mounted on the drive shaft means, low friction bearing means coupling the drive shaft means to a basin side wall, the drive means further comprising separate drive sprocket means on the drive shaft means, each engaged to a different one of the chain loops;

a plurality of pairs of driven sprocket means mounted at spaced regions along the paths of the continuous chain loops and engaging the chain loops in parallel, the driven sprocket means including hollow shaft means and rolling bearing means coupling each of the shafts to the opposite side walls of the settling basin;

a plurality of transverse flights coupled in spaced apart relation along the length of the continuous chain loops to the chain links;

at least one pair of support rail means s extending along a portion of the chain loop paths on opposite sides of the settling basin; and roller support means mounted on the flights in alignment and engagement with the support rail means along their path of extension.

2. A system as set forth in claim 1 above, wherein the support rail means comprises both a pair of upper support rails and a pair of lower support rails, and the roller support means include at least two pairs of roller supports on the flights for separate engagement with the upper and lower support rails.

3. A system as set forth in claim 1 above, wherein the chain links have ultimate individual strengths in excess of 12,000 pounds for chain link cross-sections of 0.50" on a side.

4. A system as set forth in claim 3 above, wherein the roller support means each comprise at least two pairs of rollers mounted fore and aft on the associated walls of the flights to react against torsional forces imposed on the flights by hydrodynamic flow resistance.

5. The system as set forth in claim 4 above, wherein the rolling elements are non-metallic.

6. A clarifier system for waste water treatment facilities in which water to be treated is in a long settling basin through which flights mounted on continuous chains are driven along upper sweep paths and lower return paths, comprising:

a pair of continuous loop chains disposed along parallel paths in the settling basin, the chains each comprising a plurality of pairs of low mass, high strength chain links, each characterized by a plurality of layers of individual reinforcing filaments embedded in a resin matrix and including parallel side bars and integral hemispheric end portions, the chain links also including end bushing members seated in the hemispheric end regions;

drive means including drive sprocket means mounted adjacent a side wall of the settling basin, wherein the mounting comprises a plastic cylinder bearing mount coupling the drive sprocket means to a fixed region of the side wall, the drive means further comprising a hollow fiber reinforced resin drive shaft and separate sprocket means, each engaged to a different one of the chain loops;

a plurality of pairs of driven sprocket means mounted at spaced regions along the paths of the continuous chain loops and engaging the chain loops in parallel, the driven sprocket means including hollow fiber reinforced shafts and rolling bearing means coupling each of the shafts to the opposite side walls of the settling basin;

a plurality of transverse flights coupled in spaced apart relation along the length of the continuous chain loops to the chain links, the flights being mounted to extend above the chain loops in the upper sweep path region and to depend below the chain loops in the lower return path region, the flights further including a forward facing surface moving against drag resistance of the water in the direction of movement of the chain loops and first and second end walls;

a pair of support rails extending along the chain loop paths on opposite sides of the settling basin, and a pair of lower support rails extending parallel to the chain loop paths along the bottom of the settling basin;

first roller support means mounted on the first end walls on the flights in alignment and engagement with the upper support rails for engagement on the upper sweep path; and second roller support means mounted on the second end walls on the flights and in alignment with the lower support rails, for supporting the mass of the chain loops and flights along the return path, whereby the pull force required to overcome hydrodynamic drag and surface-to-surface frictional resistance and the mass of the system are both significantly reduced, such that the system operates continuously with low power consumption, minimum corrosion and wear.

7. A system as set forth in claim 6 above, wherein the chain links have ultimate strengths in excess of 12,000 pounds for chain link cross-sections of 0.50" on a side.

8. The system as set forth in claim 7 above, wherein the flights comprise approximately C-shaped channel sections having a continuous front wall including a central sloped portion.

9. The system as set forth in claim 8 above, wherein the first roller means comprise two pairs of rollers mounted fore and aft on the associated end walls of the flights to react against torsional forces imposed on the flights by hydrodynamic flow resistance.

10. The system as set forth in claim 9 above, wherein the roller support means each comprise at least one roller and support means coupling the roller to the flight, the roller having a rolling surface turning about an axis substantially parallel to the length of the flight and including an exterior rolling surface protruding beyond the associated end wall of the flight.

11. The system as set forth in claim 10 above, wherein the rolling elements are non-metallic.

* * * * *